(12) United States Patent
Ito

(10) Patent No.: US 8,689,406 B2
(45) Date of Patent: Apr. 8, 2014

(54) CLAMPING BAND

(75) Inventor: Naoki Ito, Chino (JP)

(73) Assignee: Kabushiki Kaisha Mihama, Nagano (JP)

( * ) Notice: Subject to any disclaimer, the term of this patent is extended or adjusted under 35 U.S.C. 154(b) by 138 days.

(21) Appl. No.: 13/243,612

(22) Filed: Sep. 23, 2011

(65) Prior Publication Data

US 2012/0090137 A1    Apr. 19, 2012

(30) Foreign Application Priority Data

Oct. 15, 2010  (JP) ................. 2010-232368

(51) Int. Cl.
  *B65D 63/02*  (2006.01)
  *F16B 2/08*   (2006.01)
  *F16B 33/00*  (2006.01)

(52) U.S. Cl.
  USPC ........ 24/20 R; 24/20 TT; 24/20 CW; 24/20 S

(58) Field of Classification Search
  None
  See application file for complete search history.

(56) References Cited

U.S. PATENT DOCUMENTS

2006/0123604 A1   6/2006  Ogino
2009/0172924 A1*  7/2009  Ito et al. ............... 24/20 CW

FOREIGN PATENT DOCUMENTS

JP    4403728 B2   1/2010

* cited by examiner

*Primary Examiner* — Jack W. Lavinder
(74) *Attorney, Agent, or Firm* — Birch, Stewart, Kolasch & Birch, LLP

(57) ABSTRACT

The clamping band has a simple structure and is capable of preventing crush of an engaging claw and buckle of an inner band part, which are caused when an outer band part and the inner band part are moved close to each other to reduce an inner diameter of a band section. In the clamping band, an overriding guide is formed between the engaging claw and a second tool-catching claw of the inner band part. The overriding guide is outwardly projected to radially outwardly guide an outer end of the outer band part when the engaging claw is moved to an engage hole from a temporary engage hole.

2 Claims, 8 Drawing Sheets

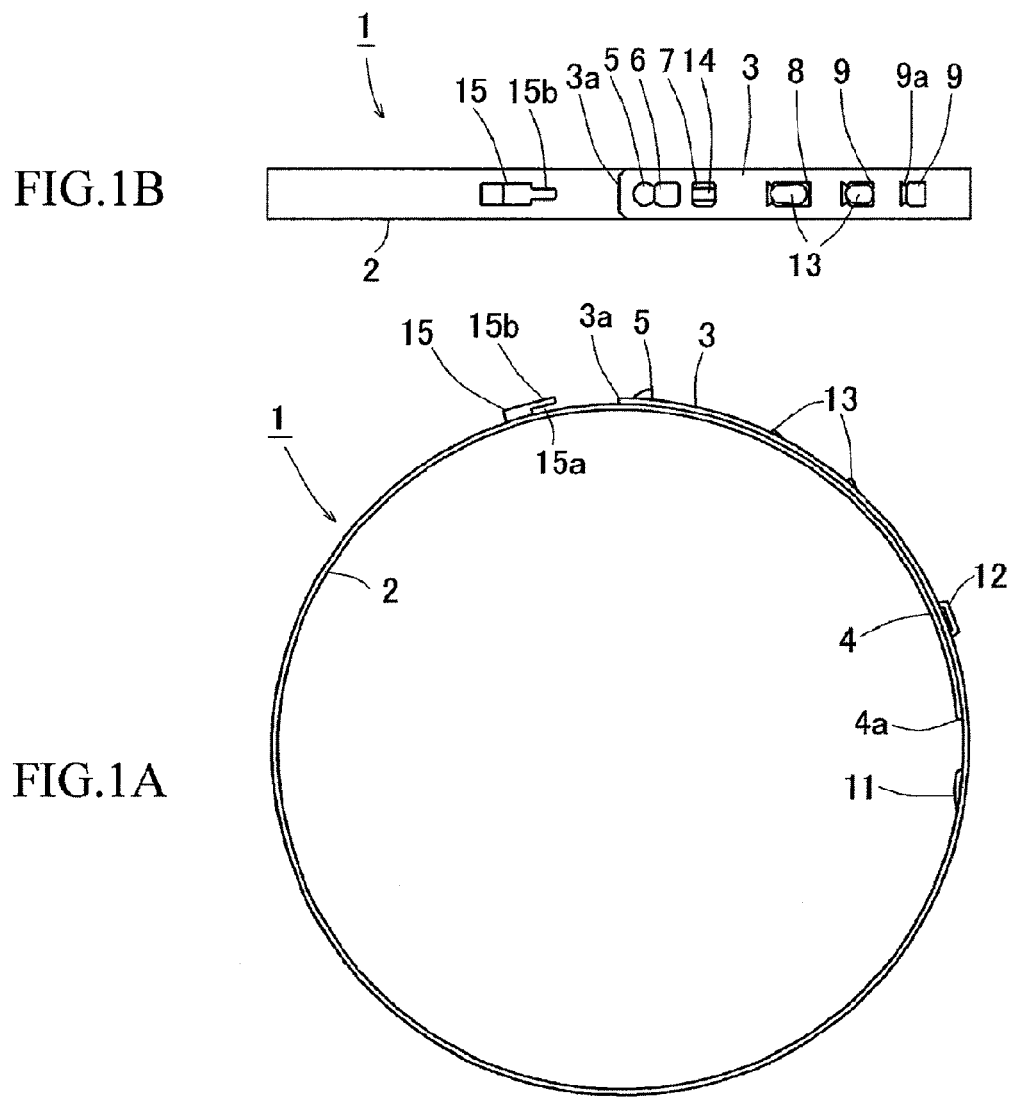

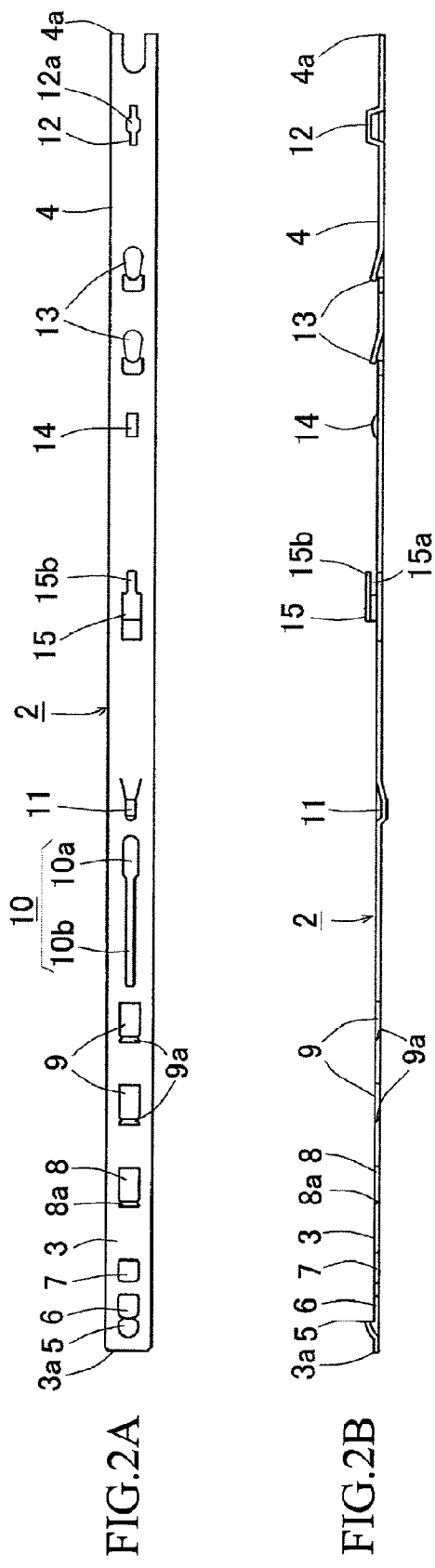

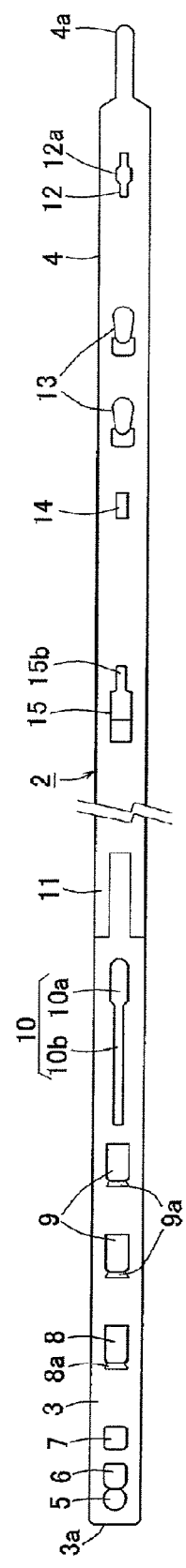
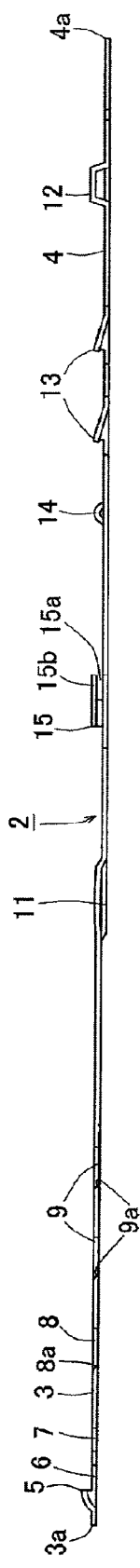
FIG.8A
FIG.8B

CLAMPING BAND

CROSS-REFERENCE TO RELATED APPLICATION

This application is based upon and claims the benefit of priority of the prior Japanese Patent Application No. P2010-232368, filed on Oct. 15, 2010 and the entire contents of which are incorporated herein by reference.

FIELD

The present invention relates to a clamping band for fixing, for example, a boot for covering a constant-velocity joint of a vehicle.

BACKGROUND

Various types of clamping bands for fixing, for example, a boot for covering a constant-velocity joint of a vehicle have been used. An example of clamping bands has a ring-shaped metallic band section, an outer band part and an inner band part of the band section are overlapped with each other, and engaging claws are engaged with engage holes, so that an inner diameter of the band section is reduced and a member to be clamped, e.g., a boot for covering a constant-velocity joint of a vehicle, can be clamped and fixed.

For example, the outer band part includes a first tool-catching claw, a slit extended from the first tool-catching claw and a plurality of the engage holes. They are formed in that order. The inner band part, which is overlapped with the outer band part, includes a plurality of the engaging claws and a second tool-catching claw. The second tool-catching claw includes an opening section, into which the outer band part can be inserted, and a holding section.

A slide guide tab, which is formed near an inner end of the inner band part, is inserted into a slit guide, which is formed in the outer band part, and one of the engaging claws is released in the slit and the other one is engaged with the engage hole, so that the band section is temporarily engaged and formed into a ring-shape. In this temporarily-clamping state, a tool is engaged with the first tool-catching claw, which is formed near the outer end of the outer band part, and the second tool-catching claw, which is formed in the inner band part, and actuated to move the tool-catching claws close to each other. With this action, the outer end of the outer band part is inserted into the opening section of the second tool-catching claw, and uplift of the outer band part is prevented by the holding section, and the outer band part overrides the engaging claws, which are formed in the inner band part, and then slides and engages the engaging claw with the engage hole. The outer band part is apt to radially outwardly bend, so there is a possibility that the outer end of the outer band part is not guided to the opening section of the second tool-catching claw. Therefore, the slit is extended from the first tool-catching claw formed in the outer band part so as to willfully reduce rigidity, and a curvature of the outer band part is made greater than that of the band section, so that uplift of the outer end of the outer band part can be prevented and the outer end can be securely inserted into the opening section of the second tool-catching claw and retained by the holding section (see Japanese Patent No. 4403728).

In the clamping band disclosed in said Japanese Patent, the first tool-catching claw and the slit, which are formed in the outer band part, are located close to the engage holes, so the outer band part strongly presses the inner band part when the first tool-catching claw and the second tool-catching claw are moved close to each other by the tool, so front ends of the engaging claws of the inner band part will be crushed. Especially, when the outer end of the outer band part is inserted into the opening section of the second tool-catching claw, the outer band part is moved toward the inner band part and pressing force of the outer band part is applied to the engaging claws. Therefore, the engaging claws will be crushed, and the inner band part is apt to buckle. To solve this problem, a prescribed region of the outer band part, which is located between the outer end and a front end wall of the engaging hole on the outer end side, is radially inwardly curved with a curvature greater than that of the band section.

However, by curving the outer band part with the curvature greater than that of the band section, a production cost of the clamping band must be increased. Further, the first tool-catching claw is located close to the engage hole, and the second tool-catching claw is located close to the engaging claw. Therefore, even if the curvature of the outer band part is changed, great drawing force is applied to the engage holes and the engaging claws and great pressing force is radially inwardly applied thereto, so the problem of crushing the front ends of the engaging claws cannot be solved. If the engaging claws are crushed, the engaging claws are easily disengaged from the engaging holes when the inner diameter of the band section is reduced.

To solve the problems, guide sections, which are radially outwardly expanded, are formed at a rear end of the slit and rear ends of the engage holes so as to easily override the engaging claws. But, the production cost of the clamping band must be further increased.

SUMMARY

Accordingly, it is objects to provide a clamping band capable of solving the above described problems of the conventional clamping bands. Namely, the clamping band of the present invention has a simple structure and is capable of preventing crush of an engaging claw and buckle of an inner band part, which are caused when an outer band part and the inner band part are moved close to each other to reduce an inner diameter of a band section.

To achieve the object, the present invention has following structures.

Namely, the clamping band of the present invention comprises:

a band section having an inner band part and an outer band part, which can be overlapped with each other to form the band section into a ring-shape, the ring-shaped band section being capable of winding on a member to be clamped;

a first tool-catching claw being formed in a flat part located in the vicinity of an outer end of the outer band part;

a guide-clearance hole, a temporary engage hole and an engage hole being formed, in the vicinity of the first tool-catching claw, in that order;

an engaging claw being formed in the inner band part, the engaging claw being capable of engaging with the engage hole so as to maintain a completely-clamping state of the band section;

a leveling section being formed in the outer band part so as to eliminate a step-like level difference which is caused by an inner end of the inner band part overlapped with the outer band part;

a second tool-catching claw being formed in the inner band part, the second tool-catching claw having an opening section, into which the outer end of the outer band part can be inserted, and a holding section, which holds the outer end of the outer band part inserted in the opening section from the outside, the second tool-catching claw being relatively moved close to the first tool-catching claw so as to reduce a diameter of the ring-shaped band section; and an overriding guide being formed between the engaging claw and the second tool-catching claw of the inner band part, the overriding guide being radially outwardly projected, the overriding guide radially outwardly guiding the outer end of the outer band part when the engaging claw is moved to the engage hole from the temporary engage hole.

By the above described structure, the first tool-catching claw, the guide-clearance hole, the temporary engage hole and the engage hole are formed, in the outer band part, in that order from the outer end. Further, the overriding guide, which is radially outwardly projected, is formed between the engaging claw and the second tool-catching claw of the inner band part, so that a distance between the first tool-catching claw and the engage hole and a distance between the second tool-catching claw and the engaging claw are long enough. Therefore, when the first tool-catching claw and the second tool-catching claw are moved close to each other by a tool, great drawing force is not applied to the engage hole and the engaging claw, and a small pressing force is radially inwardly applied, so that crush of the end of the engaging claw and buckle of the inner band part can be restrained.

Preferably, a width of the overriding guide is smaller than that of the band section, and the overriding guide is formed into a curved surface shape.

With this structure, even if force for downwardly pressing the outer band part is applied when the first tool-catching claw and the second tool-catching claw are moved close to each other by the tool, the curved surface-shaped overriding guide prevents the outer band part from being pressed onto the inner band part and contact resistance therebetween can be reduced, so that the outer end can be smoothly guided into the opening section of the second tool-catching claw and held by the holding section.

Preferably, the clamping band further comprises:

a slide guide tab being formed in the vicinity of the inner end of the inner band part; and a slit, in which the slide guide tab can be fitted and can slide, being formed between the engage hole and the leveling section of the outer band part.

With this structure, by fitting the slide guide tab into the slit, the outer band part can be easily temporarily engaged with the inner band part, and the slide guide tab is guided by the slit when the outer band part is drawn to reduce the inner diameter of the band section. Therefore, productivity of the clamping band can be improved.

In the present invention, the clamping band has the simple structure and is capable of preventing crush of the engaging claw and buckle of the inner band part, which will be caused when the outer band part and the inner band part are moved close to each other to reduce the diameter of the band section.

BRIEF DESCRIPTION OF THE DRAWINGS

Embodiments of the present invention will now be described by way of examples and with reference to the accompanying drawings, in which:

FIG. 1A is a front view of a clamping band in a temporarily-clamping state;

FIG. 1B is a plan view of the clamping band in the temporarily-clamping state;

FIG. 2A is a plan view of a band section;

FIG. 2B is a front view of the band section;

FIG. 8A is a plan view of a band section of another clamping band; and

FIG. 8B is a front view of the band section thereof.

DETAILED DESCRIPTION OF THE EMBODIMENTS

Figures 3A, 3B:
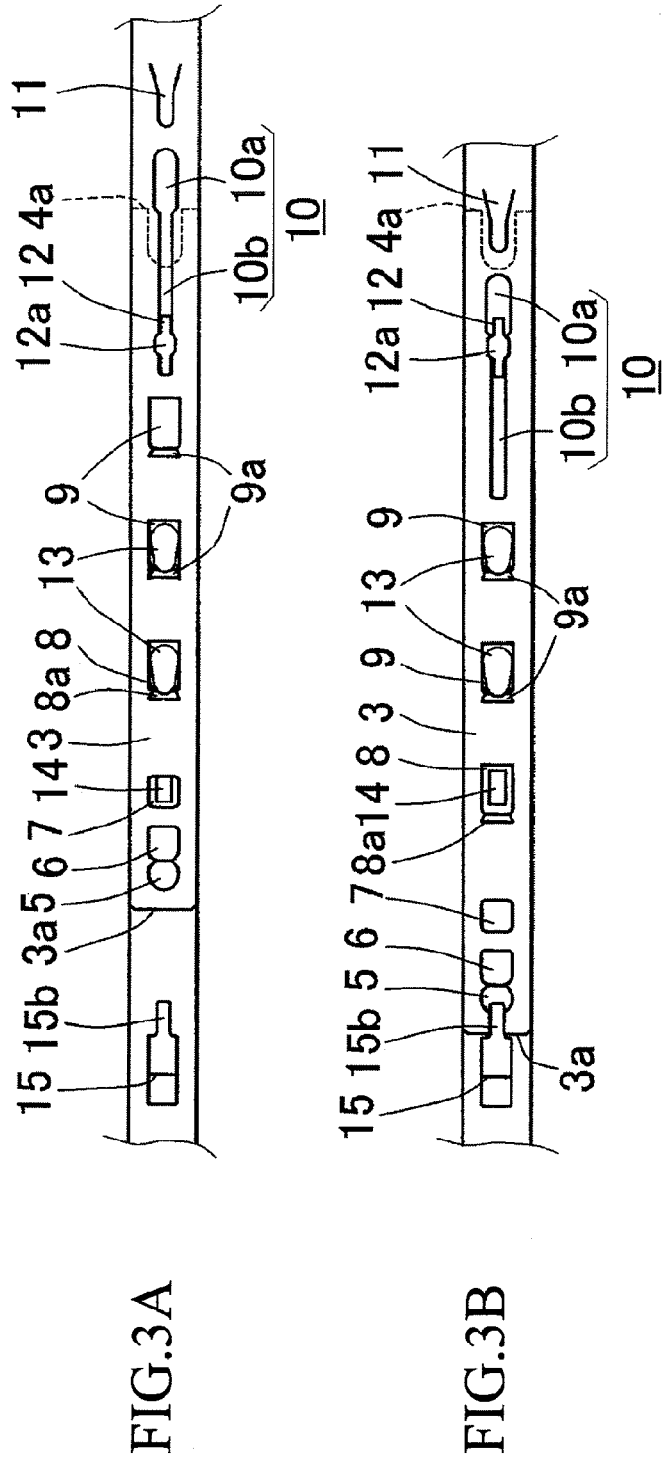
FIG. 3A is a partial plan view of the band section, in which an outer band part is in a temporarily-clamping state.
FIG. 3B is a partial plan view of the band section, in which an outer band part is in a completely-clamping state.

Preferred embodiments of the present invention will now be described in detail with reference to the accompanying drawings.

Firstly, the structure of the clamping band relating to the present invention will be explained with reference to FIGS. 1A-2B.

The clamping band 1 has a band section 2, which includes an outer band part 3 and an inner hand part 4. The outer band part 3 and the inner band part 4 can be mutually overlapped, so that the band section 2 can be formed into a ring-shape. The band section 2 is a metallic band composed of, for example, stainless steel (e.g., SUS301, SUS304, SUS430) and formed into an arc-like shape. The outer band part 3 and the inner band part 4 are mutually overlapped and temporarily engaged with each other. In this temporarily-clamping state, the outer band part 3 and the inner band part 4 are moved close to each other by a tool, so that an inner diameter of the ring-shaped band section 2 is reduced for clamping action.

Next, each part of the band section 2 will be explained with reference to FIGS. 2A and 2B.

In FIG. 2A, a first tool-catching claw 5 for being engaged with the tool, a tool-clearance hole 6 for easily handling the tool, a guide-clearance hole 7 (described later), a temporary engage hole 8 for temporarily engaging with one of engaging claws (a temporarily-clamping state) and a plurality of engage holes (e.g., two engage holes) 9 for engaging with the engaging claws (a completely-clamping state) are formed, in an outer end part 3a of the outer band part 3, in that order. Coining sections 8a and 9a are formed at front ends of the temporary engage hole 8 and the engage holes 9 so as to easily introduce front ends of the engaging claws thereinto.

A slit 10, in which a slide guide tab (described later) can be fitted and can slide, is formed in the vicinity of the engage holes 9. The slit 10 includes an insertion hole part 10a, into which a head section of the slide guide tab can be fitted, and a slit part 10b, which is extended from the insertion hole part 10a and in which the head section can slide without detaching. A leveling section 11 for eliminating a step-like level difference, which is caused by an inner end 4a of the inner band part 4, is radially formed in the vicinity of the slit 10. As shown in FIG. 2B, the leveling section 11 is formed at a transverse center of the band section 2 and projected inward.

The inner end 4a of the inner band part 4 is formed into a U-shape and overlapped with a concave part of the leveling section 11 of the outer band part 3, in a mutually complementary manner, so that the level difference can be eliminated. The slide guide tab 12 is formed in the vicinity of the inner end 4a of the inner band part 4 and projected outward. The head section 12a of the slide guide tab 12 has a flat part, whose width is smaller than that of the insertion hole part 10a of the slit 10 and greater than that of the slit part 10b thereof (see FIG. 3B). The head section 12a of the slide guide tab 12 is inserted into the insertion hole part 10a and then slid into the slit part 10b, so that the slide guide tab 12 can be retained in the slit 10 (see FIG. 3A).

A plurality of the engaging claws 13, which can engage with the engage holes 9, are formed in the inner band part 4 and located on the inner side of the slide guide tab 12. In the present embodiment, two engaging claws 13 are formed. As shown in FIG. 2B, the engaging claws 13 are formed by cutting two parts of the inner band part 4 and bending them outward.

An overriding guide 14 is formed in the inner band part 4 of the band section 2 and located in the vicinity of the engaging claws 13. A width of the overriding guide 14 is smaller than that of the band section 2, and the overriding guide 14 is formed into a curved surface shape, like an arch, and projected outward. When the engaging claws 13 are moved from the temporary engage hole 8 and one of the engage holes 9 to the both engage holes 9, the overriding guide 14 guides the outer end 3a of the outer band part 3 radially outward, so that pressing force applied, by the outer band part 3, to the engaging claws 13 can be reduced. The shape of the overriding guide 14 is not limited to the curved surface shape. Preferably, the overriding guide 14 has a smooth rounded surface capable of smoothly guiding the outer band part 3. Since the outer end 3a of the outer band part 3 is pressed toward the inner band part 4, a height of the overriding guide 14 may be equal to or slightly lower than that of the engaging claws 13.

A second tool-catching claw 15 is formed in the inner band part 4 and located at a position separated from the overriding guide 14, and the outer end 3a of the outer band part 3 can reach the second tool-catching claw 15 in the completely-clamping state. The second tool-catching claw 15 has an opening section 15a, into which the outer end 3a can be inserted, and a holding section 15b, which holds the outer end 3a inserted in the opening section 15a from outside.

In FIGS. 1B and 3A, the band section 2 is formed into the ring-shape, and then the head section 12a of the slide guide tab 12 is inserted into the insertion hole part 10a and slid into the slit part 10b, so that the slide guide tab 12 is engaged with and retained in the slit 10. The overriding guide 14 is accommodated in the guide-clearance hole 7 of the outer band part 3, one of the engaging claws 13 engages with the temporary engage hole 8 and the other engaging claw 13 engages with one of the engage holes 9. Namely, the band section 2 is in the temporarily-clamping state as shown in FIG. 1A.

Next, the process from the temporarily-clamping state to the completely-clamping state, in which the inner diameter of the clamping band 1 is reduced, will be explained with reference to FIGS. 4-7C. Note that, FIGS. 7A-7C respectively correspond to FIGS. 4-6.

Figure 4:
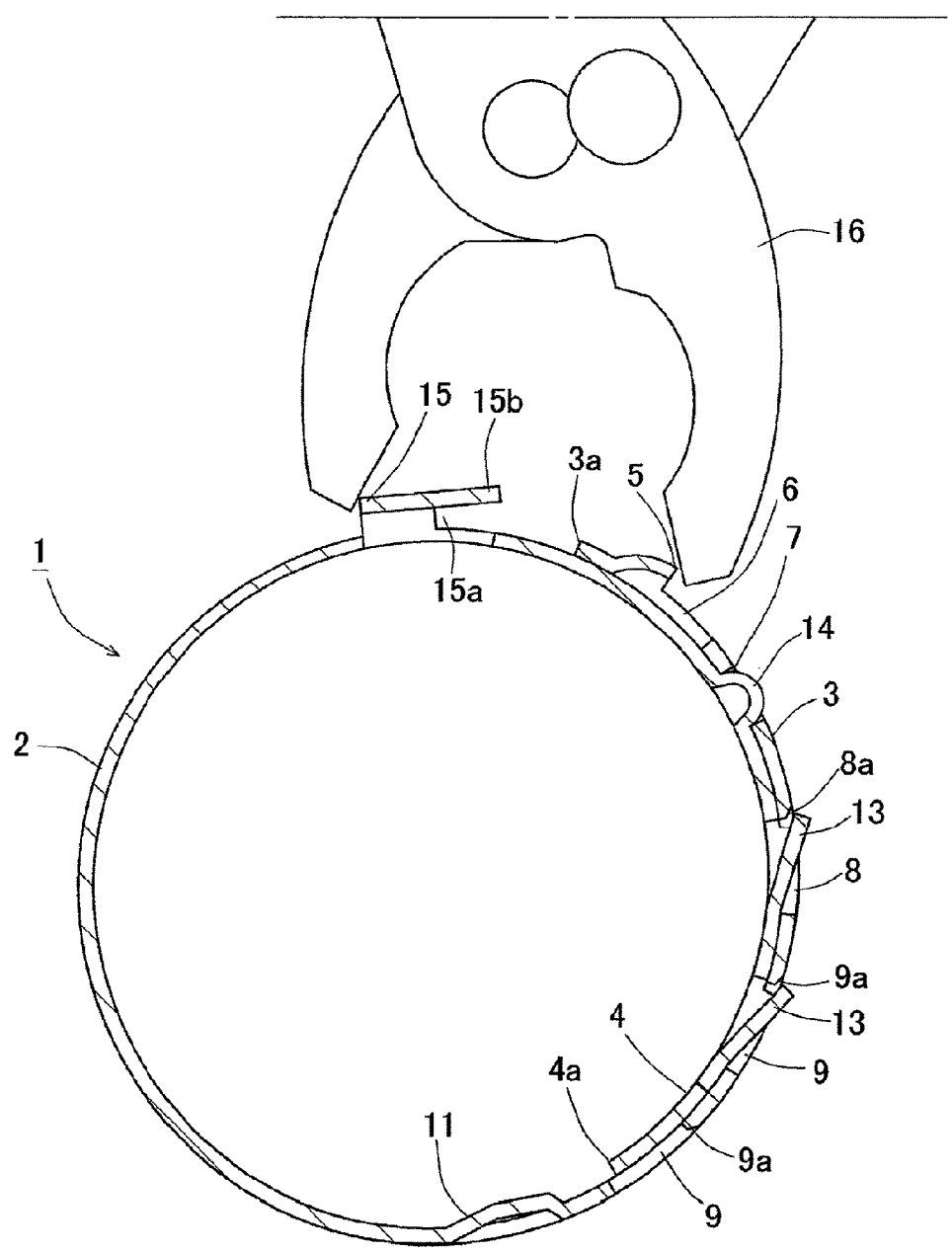
FIG. 4 is a front view of the clamping band in the temporarily-clamping state, in which a tool is engaged with a first tool-catching claw and a second tool-catching claw.

In the temporarily-clamping state, the tool 16, e.g., a pair of pliers, engage with the first tool-catching claw 5 and the second tool-catching claw 15 to begin the clamping action (see FIG. 4). Since the tool-clearance hole 6 is formed in the first tool-catching claw 5, one of front ends of the tool 16 can be easily engaged with the first tool-catching claw 5 (see FIG. 4). In this state, a distance between the first tool-catching claw 5 and the engage holes 9 and a distance between the second tool-catching claw 15 and the engaging claws 13 are long. Therefore, when the first tool-catching claw 5 and the second tool-catching claw 15 are moved close to each other by the tool 16 engaging therewith, great drawing force is not applied to the engage holes 9 and the engaging claws 13 and pressing force of the outer band part 3, which is applied radially inward, is small, so that crushing front ends of the engaging claws 13 and buckle of the inner band part 4 can be restrained, as described later.

Figure 5:
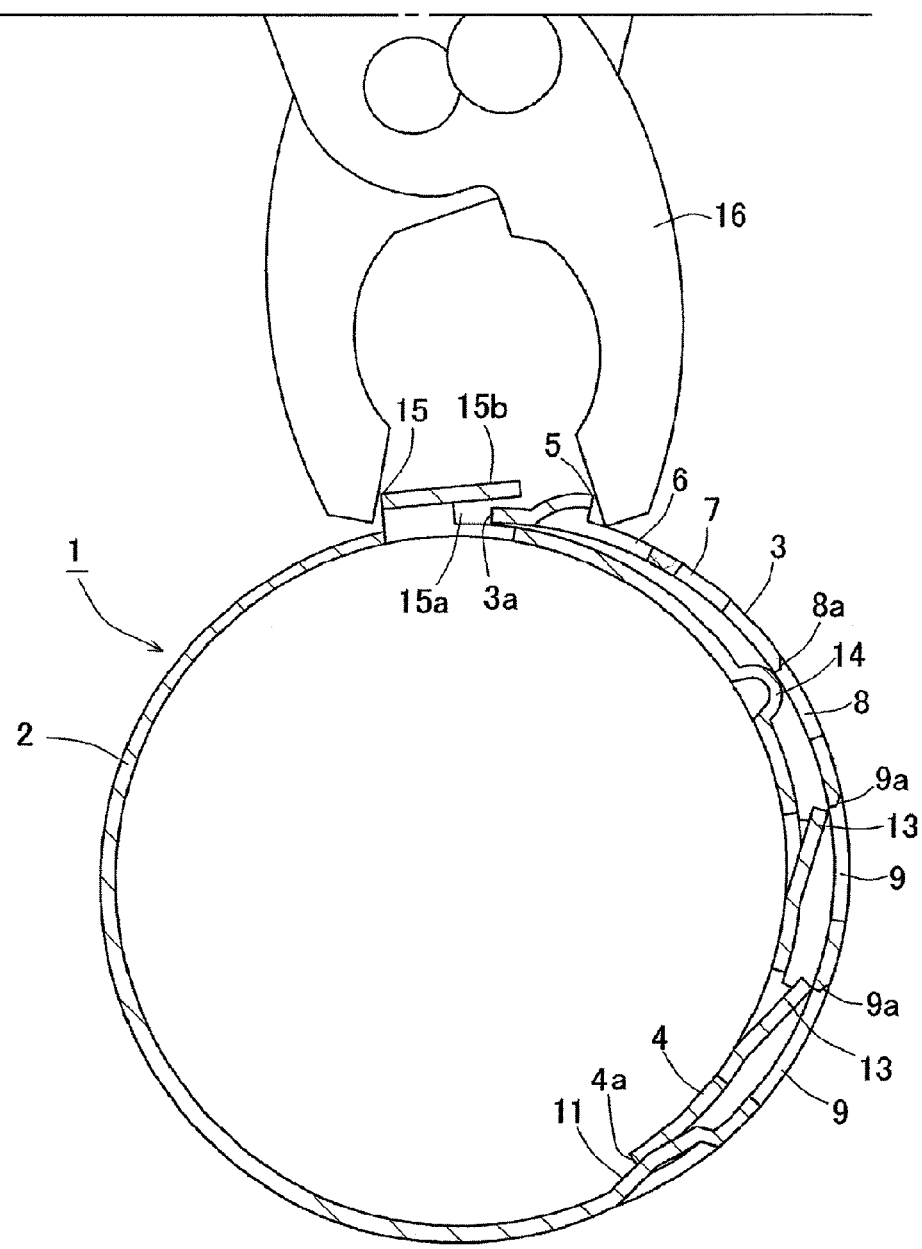
FIG. 5 is a front view of the clamping band, in which the first tool-catching claw and the second tool-catching claw are being moved close to each other by the tool.

In FIG. 5, the first tool-catching claw 5 and the second tool-catching claw 15 are relatively moved close to each other by actuating the tool 16, so that the outer end 3a of the outer band part 3 slides toward the opening section 15a of the second tool-catching claw 15. At this time, the tool 16 moves the outer end 3a toward the second tool-catching claw 15 and the outer end 3a is pressed toward the inner band part 4. With this action, the front ends of the engaging claws 13 are disengaged from the temporary engage hole 8 and one of the engage hole 9 and pressed by the outer band part 3. However, the overriding guide 14, which has been exited from the guide-clearance hole 7, radially outwardly guides the outer band part 3 to separate from the inner band part 4, so that pressing force applied from the outer band part 3 to the inner band part 4 can be reduced, deformation of the engaging claws 13 can be prevented and buckle of the inner band part 4 can be prevented (see FIG. 7B).

Since the overriding guide 14 is formed into the curved surface shape and its width is smaller than that of the band section 2, contact resistance can be reduced and the outer band part 3 can be smoothly moved toward the opening section 15a of the second tool-catching claw 15.

Figure 6:
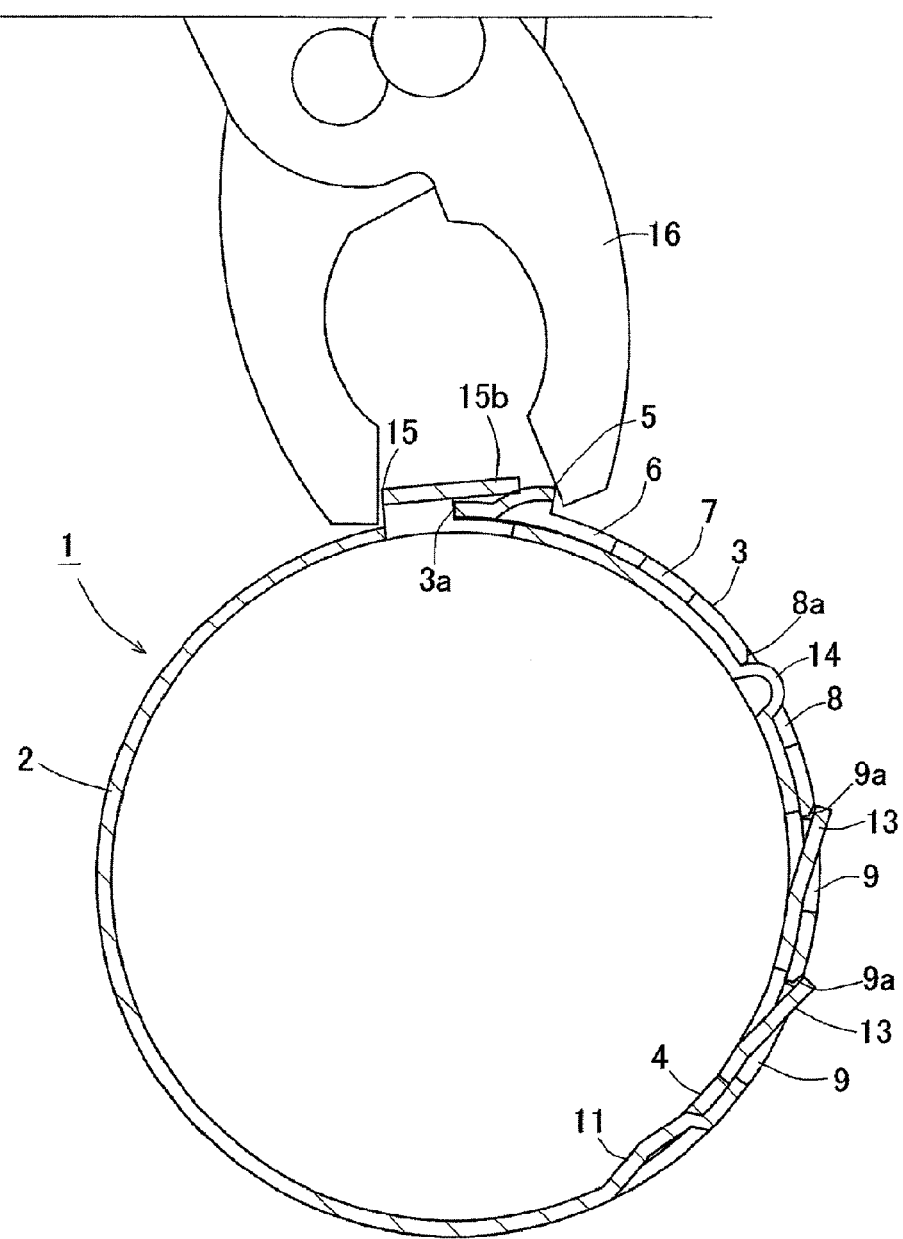
FIG. 6 is a front view of the clamping band, in which the first tool-catching claw and the second tool-catching claw have been completely moved close to each other.

In FIG. 6, when the outer end 3a of the outer band part 3 enters the opening section 15a of the second tool-catching claw 15, the clamping action performed by the tool 16 is completed. In this completely-clamping state, the overriding guide fits in the temporarily engage hole 8, and the engaging claws 13 are guided, by the coining sections 9a, to and fit into the engage holes 9 for engagement.

The inner end 4a of the inner band part 4 and the leveling section 11 are mutually fitted in a mutually complementary manner, so that the step-like level difference between the inner and outer band parts can be eliminated.

Figure 7A:
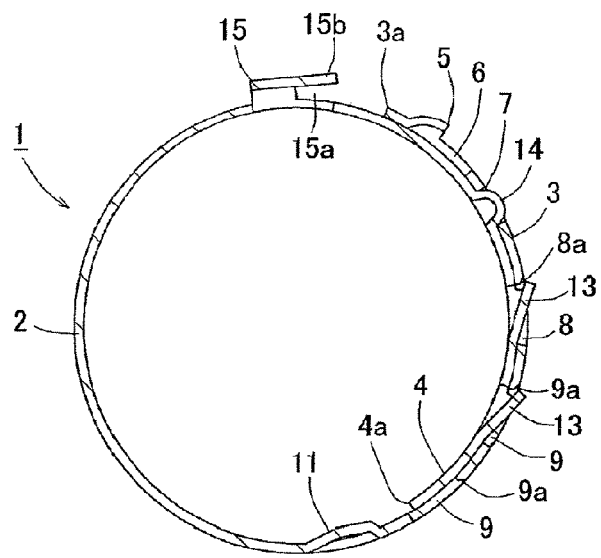
FIG. 7A is a sectional view of the clamping band in the temporarily-clamping state.
Figure 7B:
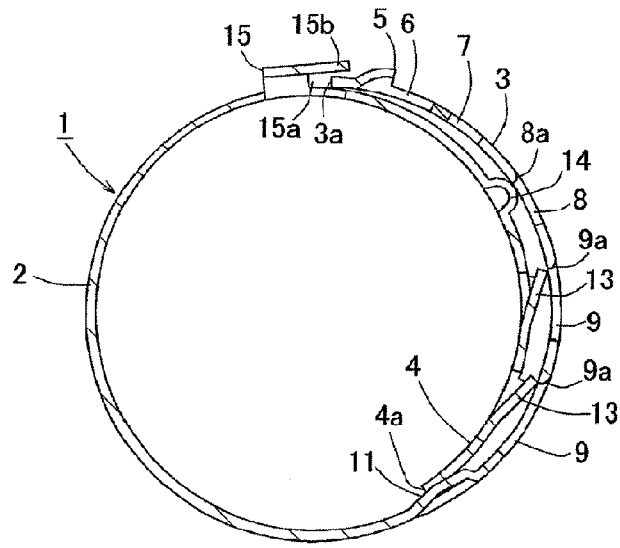
FIG. 7B is a sectional view of the clamping band in a state of progressing the clamping operation.
Figure 7C:
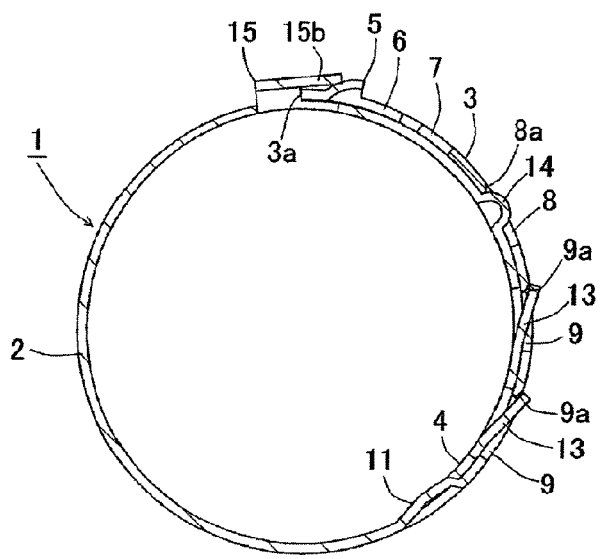
FIG. 7C is a sectional view of the clamping band in the completely-clamping state.

Further, flip-up of the outer end 3a of the outer band part 3 can be prevented by the holding section 15b (see FIG. 7C).

In the above described embodiment, the clamping band 1 has the simple structure and is capable of preventing crush of the engaging claws 13 and buckle of the inner band part 4, which are caused when the outer band part 3 and the inner band part 4 are moved close to each other to reduce an inner diameter of a band section 2.

Note that, in case that the inner diameter of the clamping band 1 small, e.g., 40 mm or less, the slit 10 of the outer band part 3 and the slide guide tab 12 of the inner band part 4 may be omitted.

In the above described embodiment, the leveling section 11 is designed to fit in the U-shaped inner end 4a of the inner band part 4, but the shape and the size of them are not limited to the embodiment. For example, as shown in FIGS. 8A and 8B, the inner end part 4a of the inner band part 4 may be formed into a tongue-shape, and a part of an overlapping part of the leveling section 11 (a transverse center of the band section 2) is embossed outward so as to form a recess for eliminating the step-like level difference between the inner and outer band parts.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A clamping band, comprising:
   a band section having an inner band part and an outer band part, which can be overlapped with each other to form the band section into a ring-shape, the ring-shaped band section being capable of winding on a member to be clamped;
   a first tool-catching claw being formed in a flat part located in the vicinity of an outer end of the outer band part;
   a guide-clearance hole, a temporary engage hole and an engage hole being formed, in the vicinity of the first tool-catching claw, in that order;
   an engaging claw being formed in the inner band part, the engaging claw being capable of engaging with the engage hole so as to maintain a completely-clamping state of the band section;
   a leveling section being formed in the outer band part so as to eliminate a step-like level difference which is caused by an inner end of the inner band part overlapped with the outer band part;
   a second tool-catching claw being formed in the inner band part, the second tool-catching claw having an opening section, into which the outer end of the outer band part can be inserted, and a holding section, which holds the outer end of the outer band part inserted in the opening section from the outside, the second tool-catching claw being relatively moved close to the first tool-catching claw so as to reduce a diameter of the ring-shaped band section;
   an overriding guide being formed between the engaging claw and the second tool-catching claw of the inner band part, the overriding guide being radially outwardly projected, the overriding guide radially outwardly guiding the outer end of the outer band part when the engaging claw is moved to the engage hole from the temporary engage hole;
   a slide guide tab being formed in the vicinity of the inner end of the inner band part; and
   a slit, in which the slide guide tab can be fitted and can slide, being formed between the engage hole and the leveling section of the outer band part.

2. The clamping band according to claim 1, wherein a width of the overriding guide is smaller than that of the band section, and the overriding guide is formed into a curved surface shape.

* * * * *